(12) United States Patent
Alexander et al.

(10) Patent No.: US 8,555,633 B2
(45) Date of Patent: Oct. 15, 2013

(54) VEHICLE ENERGY HARVESTING DEVICE HAVING A CONTINUOUS LOOP OF SHAPE MEMORY ALLOY MATERIAL

(75) Inventors: Paul W. Alexander, Ypsilanti, MI (US); Alan L. Browne, Grosse Pointe, MI (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 512 days.

(21) Appl. No.: 12/947,862

(22) Filed: Nov. 17, 2010

(65) Prior Publication Data

US 2011/0120112 A1    May 26, 2011

Related U.S. Application Data

(60) Provisional application No. 61/263,294, filed on Nov. 20, 2009.

(51) Int. Cl.

| F01B 29/10 | (2006.01) |
| F02G 1/04 | (2006.01) |
| F02G 3/00 | (2006.01) |
| F01N 3/02 | (2006.01) |
| F01N 5/02 | (2006.01) |

(52) U.S. Cl.
USPC ............... 60/527; 60/529; 60/320; 60/616

(58) Field of Classification Search
USPC .................................. 60/527–529
See application file for complete search history.

(56) References Cited

U.S. PATENT DOCUMENTS

| 4,150,544 A | 4/1979 | Pachter |
| 4,281,513 A * | 8/1981 | Johnson et al. ............... 60/527 |

FOREIGN PATENT DOCUMENTS

| CN | 2515437 Y | 10/2002 |
| CN | 101680352 A | 3/2010 |
| JP | 2003232276 A | 8/2003 |
| JP | 2009203875 A | 9/2009 |

* cited by examiner

*Primary Examiner* — Kenneth Bomberg
*Assistant Examiner* — Christopher Jetton
(74) *Attorney, Agent, or Firm* — Quinn Law Group, PLLC

(57) ABSTRACT

An energy harvesting system includes a heat engine and a component. The heat engine includes first and second regions, a conduit, and a shape memory alloy (SMA) material. The conduit extends along a central axis. The SMA material surrounds the conduit and is disposed in one of the regions. The SMA material is radially spaced from a secondary axis that surrounds the central axis. A localized region of the SMA material changes crystallographic phase from martensite to austenite and contract in response to exposure to the first temperature. The localized region of the SMA material also changes crystallographic phase from austenite to martensite and expands in response to exposure to the second temperature. The SMA material rotates about the secondary axis in response to the contraction and expansion of the localized region of the SMA material. Rotation of the SMA material about the secondary axis drives the component.

17 Claims, 3 Drawing Sheets

VEHICLE ENERGY HARVESTING DEVICE HAVING A CONTINUOUS LOOP OF SHAPE MEMORY ALLOY MATERIAL

CROSS-REFERENCE TO RELATED APPLICATIONS

This application claims the benefit of U.S. Provisional Patent Application Ser. No. 61/263,294, filed on Nov. 20, 2009, the disclosure of which is hereby incorporated by reference.

TECHNICAL FIELD

The present invention generally relates to a vehicle, and more specifically, to an energy source for the vehicle and vehicle accessories.

BACKGROUND

Vehicles are traditionally powered by engines and/or batteries, which power the vehicle and provide the power to charge a battery of the vehicle. The battery provides power for starting the engine and for operating various vehicle accessories. During operation, the engine produces a large quantity of excess heat, i.e., excess thermal energy that is typically dissipated into the atmosphere and lost. Advancements in technology and desire for driver conveniences have led to additional power loads from the accessory systems. The increased power loads have led to greater demand on the vehicle power sources. In addition, a large portion of the power from the vehicle's power sources is lost as heat.

However, arrangements for extending the fuel economy of a vehicle are desirable in light of the growing concern for fuel efficient vehicles. Therefore, arrangements that reduce the power load and/or increase the efficiency of the vehicle's traditional power sources, such as the battery and the engine are desirable.

SUMMARY

A heat engine is configured to be operatively connected to a component. The heat engine includes a first region, a second region, a conduit, and at least one piece of shape memory alloy material. The first region is at one of a first temperature and a second temperature. The second region is spaced from the first region and is at the other of the first temperature and the second temperature. The conduit is disposed in the first region and extends along a central axis. The at least one piece of shape memory alloy material circumferentially surrounds the conduit about the central axis and is configured to be at least partially disposed in one of the first region and the second region. The at least one piece of shape memory alloy material is radially spaced from a secondary axis that circumferentially surrounds the central axis. The at least one localized region of the at least one piece of shape memory alloy material is configured to selectively change crystallographic phase from martensite to austenite and thereby circumferentially contract in response to exposure to the first temperature. The at least one localized region of the at least one piece of shape memory alloy material is also configured to selectively change crystallographic phase from austenite to martensite and thereby circumferentially expand in response to exposure to the second temperature. The at least one piece of shape memory alloy material is configured to rotate about the secondary axis in response to the contraction and expansion of the at least one localized region of the at least one piece of shape memory alloy material such that the at least one localized region of the at least one piece of shape memory alloy material moves into and out of the first and second regions.

An energy harvesting system includes a heat engine and a component. The heat engine includes a first region, a second region, a conduit, and at least one piece of shape memory alloy material. The first region is at one of a first temperature and a second temperature. The second region is spaced from the first region and is at the other of the first temperature and the second temperature. The conduit is disposed in the first region and extends along a central axis. The at least one piece of shape memory alloy material circumferentially surrounds the conduit about the central axis and is configured to be at least partially disposed in one of the first region and the second region. The at least one piece of shape memory alloy material is radially spaced from a secondary axis that circumferentially surrounds the central axis. The at least one localized region of the at least one piece of shape memory alloy material is configured to selectively change crystallographic phase from martensite to austenite and thereby circumferentially contract in response to exposure to the first temperature. The at least one localized region of the at least one piece of shape memory alloy material is also configured to selectively change crystallographic phase from austenite to martensite and thereby circumferentially expand in response to exposure to the second temperature. The at least one piece of shape memory alloy material is configured to rotate about the secondary axis in response to the contraction and expansion of the at least one localized region of the at least one piece of shape memory alloy material such that the at least one localized region of the at least one piece of shape memory alloy material moves into and out of the first and second regions. The component is operatively connected to the at least one shape memory alloy material such that rotation of the shape memory alloy material about the secondary axis drives the component.

An energy harvesting system includes a heat engine and a component. The heat engine includes a first region, a second region, a conduit, and at least one wire. The first region is at one of a first temperature and a second temperature. The second region is spaced from the first region and is at the other of the first temperature and the second temperature. The conduit is disposed in the first region and extends along a central axis. The at least one wire forms a continuous loop and circumferentially surrounds the conduit about the central axis. The wire is configured to be at least partially disposed in one of the first region and the second region. The wire is radially spaced from a secondary axis that circumferentially surrounds the central axis. At least one localized region of the at least one wire is configured to selectively change crystallographic phase from martensite to austenite and thereby circumferentially contract in response to exposure to the first temperature. The at least one localized region of the at least one wire is also configured to selectively change crystallographic phase from austenite to martensite and thereby circumferentially expand in response to exposure to the second temperature. The at least one wire is configured to rotate about the secondary axis in response to the contraction and expansion of the at least one localized region of the at least one wire such that the at least one localized region of the at least one wire moves into and out of the first and second regions. The component is operatively connected to the at least one wire such that rotation of the wire about the secondary axis drives the component.

The above features and advantages and other features and advantages of the present invention are readily apparent from

DETAILED DESCRIPTION

Figure 1:
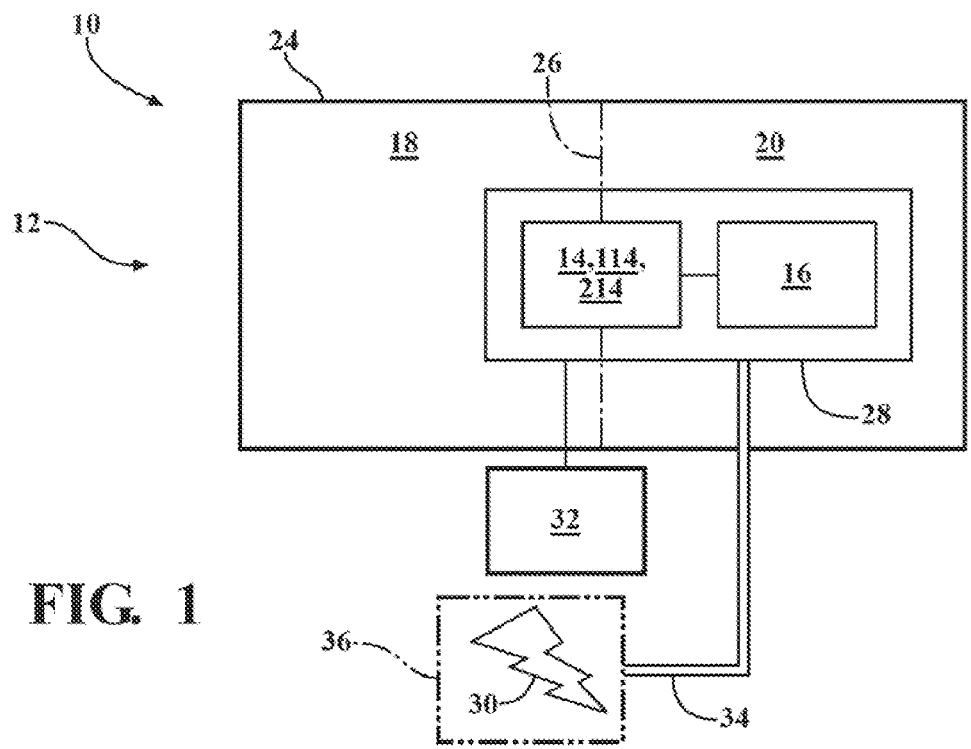
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 12. The energy harvesting system 12 may include a heat engine 14 and a driven component 16.

Figure 2:
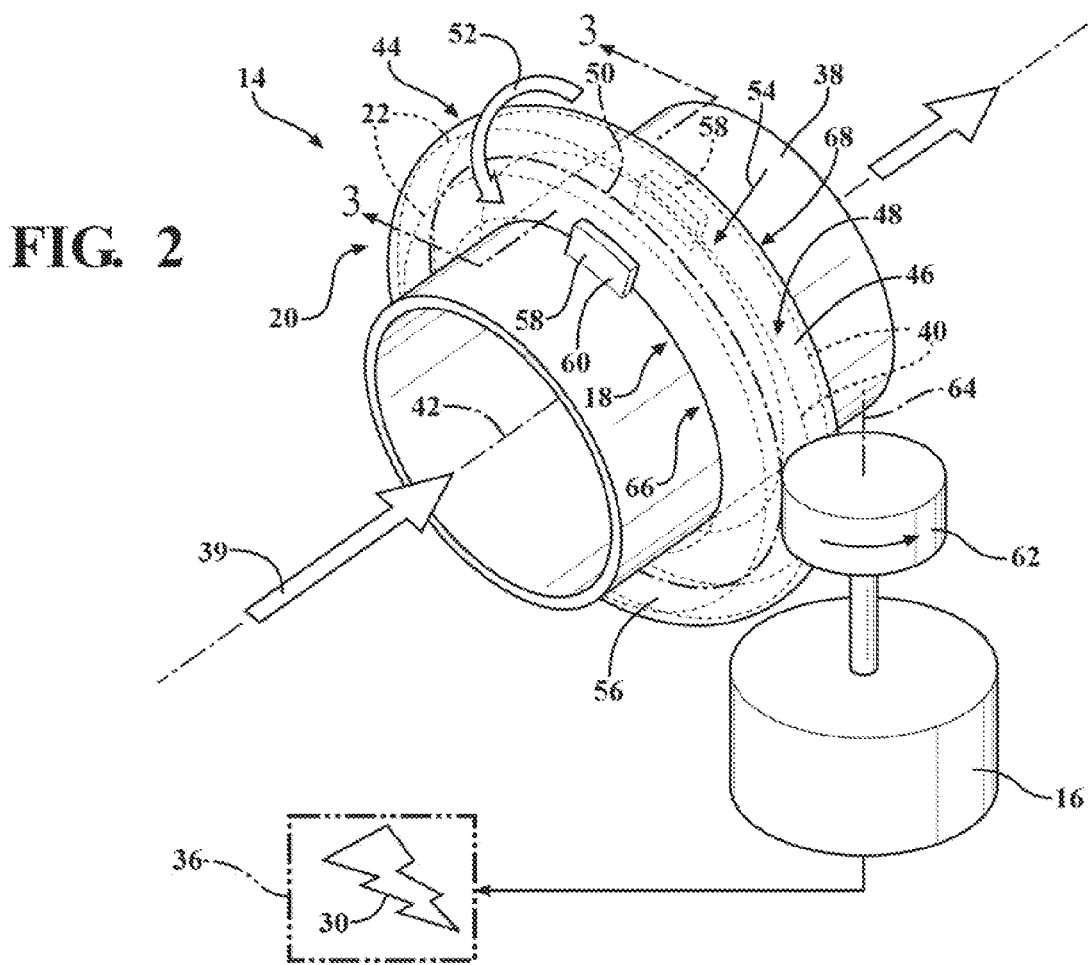
FIG. 2 is a schematic perspective view of a first embodiment of the energy harvesting system of FIG. 1 having a heat engine including a torus.

Referring to the FIG. 2, the heat engine 14 includes a shape memory alloy material 22 and is operatively disposed in a first region 18 and a second region 20. The heat engine 14 is configured to convert thermal energy, e.g., heat, to mechanical energy and from mechanical energy to electrical energy. More specifically, the energy harvesting system 12 utilizes a temperature differential between the first region 18 and the second region 20 to generate mechanical and/or electrical energy via the shape memory alloy material 22, as explained in more detail below.

Referring again to FIG. 1, the vehicle 10 defines a compartment 24 which may house power and drive sources for the vehicle 10, i.e., an engine and transmission (not shown), which generate heat. The compartment 24 may or may not be enclosed from the surrounding environment, and may include one or more regions and components such as an exhaust pipe, a catalytic converter, shock absorbers, brakes, and any other region where energy is dissipated, such as in a passenger compartment or a battery compartment, i.e., in an electric vehicle.

The energy harvesting system 12 is located at least partially within the compartment 24. The compartment 24 includes the first region 18, having a first temperature, and the second region 20, having a second temperature, different from the first temperature. The first temperature may be greater than the second temperature.

The first region 18 and the second region 20 may be spaced from one another, or be separated by a sufficient heat exchange barrier 26, such as a heat shield, a Peltier device, and the like. The heat exchange barrier 26 may be employed to separate the compartment 24 into the first region 18 and the second region 20 such that a desired temperature differential between the first region 18 and the second region 20 is achieved. Fluid within the first region 18 and the second region 20 of the energy harvesting system 12 may be gas, liquid, or combinations thereof. It should be appreciated that the regions 18, 20 are not limited to using fluid to promote heat transfer between the regions 18, 20 and the shape memory alloy material 22. Instead, the regions 18, 20 may also be configured as one or more objects, i.e., a surface and the like, that promotes heat transfer between the object(s) having the different fluid regions 18, 20 and the to the shape memory alloy material 22. When the heat exchange barrier 26 disposed between the first and second regions 18, 20 is a Peltier device, the heat exchange barrier 26 is configured to generate heat on one side of the barrier 26 and to cool on an opposing side of the barrier 26. The first and second regions 18, 20 may be fluidly connected to a pair of cylinder heads (not shown) that capture the energy given off from the respective region 18, 20. A pump may be disposed in fluid communication with at least one of the first and second regions 18, 20 and the cylinder heads to circulate and move the fluid. The energy harvesting system 12 may be configured to utilize temperature differentials between the first and second regions 18, 20 in the vehicle 10 in areas such as, proximate a catalytic converter, a vehicle battery, a transmission, brakes, suspension components, i.e., a shock absorber, and/or a heat exchanger, i.e., a radiator. Additionally, the energy harvesting system 12 may be configured to utilize temperature differentials between the first and second regions 18, 20 in the vehicle 10 within a battery compartment 24 for an electric vehicle or within the heat exchanger. It should be appreciated that the energy harvesting system 12 may be configured to utilize temperature differentials in other areas of the vehicle, as known to those skilled in the art. One skilled in the art would be able to determine areas having an associated temperature differential and an appropriate position for the heat engine 14 of the energy harvesting system 12 to take advantage of the temperature differentials.

The compartment 24 may be an engine compartment, where fluid within the first region 18 and the second region 20 is air. However, it should be appreciated that other fluids, as known to those skilled in the art, may also be used within the compartment 24. Further, the heat engine 14 and the component 16 may be surrounded by a vented housing 28. The housing 28 may define cavities (not shown) through which electronic components, such as wires may pass.

Referring to FIG. 2, the shape memory alloy material 22 is disposed in thermal contact, or heat exchange relationship, with each of the first and second regions 18, 20. The shape memory alloy material 22 of the heat engine 14 has a crystallographic phase changeable between austenite and martensite in response to exposure to the first and second temperatures of the first and second regions 18, 20. As used herein, the terminology "shape memory alloy" (SMA) refers to alloys which exhibit a shape memory effect. That is, the shape memory alloy material 22 may undergo a solid state phase change via molecular rearrangement to shift between a martensite phase, i.e., "martensite", and an austenite phase, i.e., "austenite". Stated differently, the shape memory alloy material 22 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material 22 begins to change from the austenite phase to the martensite phase is known as the martensite start temperature, $M_s$. The temperature at which the shape memory alloy material 22 completes the change from the austenite phase to the martensite phase is known as the martensite finish temperature, $M_f$. Similarly, as the shape memory alloy material 22 is heated, the temperature at which the shape memory alloy material 22 begins to change from the martensite phase to the austenite phase is known as the austenite start temperature, $A_s$. The temperature at which the shape memory alloy material 22 completes the change from the martensite phase to the austenite phase is known as the austenite finish temperature, $A_f$.

Therefore, the shape memory alloy material 22 may be characterized by a cold state, i.e., when a temperature of the shape memory alloy material 22 is below the martensite finish temperature $M_f$ of the shape memory alloy material 22. Likewise, the shape memory alloy material 22 may also be characterized by a hot state, i.e., when the temperature of the shape memory alloy material 22 is above the austenite finish temperature $A_f$ of the shape memory alloy material 22.

In operation, shape memory alloy material 22 that is pre-strained or subjected to tensile stress can change dimension upon changing crystallographic phase to thereby convert thermal energy to mechanical energy. That is, the shape memory alloy material 22 may change crystallographic phase from martensite to austenite and thereby dimensionally contract if pseudoplastically pre-strained so as to convert thermal energy to mechanical energy. Conversely, the shape memory alloy material 22 may change crystallographic phase from austenite to martensite and if under stress thereby dimensionally expand so as to also convert thermal energy to mechanical energy.

Pseudoplastically pre-strained refers to stretching the shape memory alloy material 22 while in the martensite phase so that the strain exhibited by the shape memory alloy material 22 under that loading condition is not fully recovered when unloaded, where purely elastic strain would be fully recovered. In the case of shape memory alloy material 22, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy material 22 transforms to its austenite phase, that strain can be recovered, returning the shape memory alloy material 22 to the original length observed prior to any load was applied. Shape memory alloy material 22 may be stretched before installation into the heat engine 14, such that a nominal length of the shape memory alloy material 22 includes that recoverable pseudoplastic strain, which provides the motion used for actuating/driving the heat engine 14. Without pre-stretching the shape memory alloy material 22, little deformation would be seen during phase transformation.

The shape memory alloy material 22 may have any suitable composition. In particular, the shape memory alloy material 22 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy material 22 can be binary, ternary, or any higher order so long as the shape memory alloy material 22 exhibits a shape memory effect, e.g., a change in shape orientation, damping capacity, and the like. A skilled artisan may select the shape memory alloy material 22 according to desired operating temperatures within the compartment 24 (FIG. 1), as set forth in more detail below. In one specific example, the shape memory alloy material 22 may include nickel and titanium.

Referring again to FIGS. 1 and 2, the driven component 16 of the energy harvesting system 12 may be configured to be driven by the mechanical energy or power generated from the conversion of thermal energy to mechanical energy within the heat engine 14. In particular, the aforementioned dimensional contraction and the dimensional expansion of the shape memory alloy material 22 may drive the component 16. The component 16 may be a simple mechanical device, such as a generator, a fan, a clutch, a blower, a pump, a compressor, and combinations thereof. It should be appreciated that the component 16 is not limited to these devices, as any other device known to those skilled in the art may also be used. The component 16 may be operatively connected to the heat engine 14 such that the component 16 is driven by the heat engine 14. More specifically, the component 16 may be part of an existing system within the vehicle 10 such as a heating or cooling system and the like. Alternatively, heat engine 14 may be configured such that the component 16 is at least partially incorporated therein. More specifically, heat engine 14 may be configured such that the component 16 is not an entirely separate device. The mechanical energy provided by the shape memory alloy material 22, as described above, may drive the component 16 or may provide assistance to other systems of the vehicle 10 in driving the component 16. Driving the component 16 with mechanical energy provided by the heat engine 14 may also allow an associated existing system within the vehicle 10 to be decreased in size and/or capacity or eliminated entirely. For example, the heat engine 14 may be configured to assist in driving a fan for the heating and/or cooling system, allowing a capacity of the main heating and cooling system to be decreased, while providing weight and energy savings. Additionally, the mechanical energy produced by the energy harvesting system 12 may be used to directly drive the component 16 or be stored for later use. Therefore, the energy harvesting system 12 may be configured to provide additional energy to operate the vehicle 10 and reduce the load on a main energy source for driving the vehicle 10. Thus, the energy harvesting system 12 increases the fuel economy and range of the vehicle 10. Also, the energy harvesting system 12 may be configured to operate autonomously such that no input from the vehicle 10 is required.

When the component 16 is a generator, the component/generator 16 may be configured to convert mechanical energy from the heat engine 14 to electricity, as shown as 30 in FIGS. 1 and 2. The component/generator 16 may be any suitable device configured to convert mechanical energy to electricity 30. For example, the component/generator 16 may be an electrical generator that converts mechanical energy to electricity 30 using electromagnetic induction. The component/generator 16 may include a rotor (not shown) that rotates with respect to a stator (not shown) to generate electricity 30. The electricity 30 generated by the component/generator 16 may then be used to assist in powering one or more systems within the vehicle 10.

Additionally, referring to FIG. 1, the energy harvesting system 12 may include an electric control unit 32 (ECU) that is configured to control the first and second temperature of the fluid in the first and second regions 18, 20, respectively. The ECU 32 may be operatively connected to the vehicle 10. The ECU 32 may be a computer that electronically communicates with one or more controls and/or sensors of the energy harvesting system 12. For example, the ECU 32 may communicate with temperature sensors within the first and/or second regions 18, 20, a speed regulator of the component 16, fluid flow sensors, and/or meters configured for monitoring electricity 30 generation of the component/generator 16. Additionally, the ECU 32 may be configured to control the harvesting of energy under predetermined conditions of the vehicle 10, e.g., after the vehicle 10 has operated for a sufficient period of time such that a temperature differential between the first region 18 and the second region 20 is at an optimal differential. It should be appreciated that other predetermined conditions of the vehicle 10 may also be used, as known to those skilled in the art. The ECU 32 may also be configured to provide an option to manually override the heat engine 14 and allow the energy harvesting system 12 to be turned off. A clutch (not shown) may also be controlled by the ECU 32 to selectively disengage the heat engine 14 from the component 16.

As also shown in FIG. 1, the energy harvesting system 12 may also include a transfer medium 34 configured to convey electricity 30 from the energy harvesting system 12. In particular, the transfer medium 34 may convey electricity 30 from the component 16. The transfer medium 34 may be, for example, a power line or an electrically-conductive cable. The transfer medium 34 may convey electricity 30 from the generator 16 to a storage device 36, e.g., a battery for the vehicle. The storage device 36 may be located proximate to, but separate from, the vehicle 10. Such a storage device 36 may allow the energy harvesting system 12 to be utilized, for example, with a parked vehicle 10. In another example, the energy harvesting system 12 may be configured to take advantage of a temperature differential created by a sun load on a hood for the corresponding compartment 24 and convert the mechanical energy created from the temperature differential into electrical energy 30 to be stored within the storage device 36.

It is to be appreciated that for any of the aforementioned examples, the vehicle 10 and/or the energy harvesting system 12 may include a plurality of heat engines 14 and/or a plurality of component 16. That is, one vehicle 10 may include more than one heat engine 14 and/or component 16. For example, one heat engine 14 may drive more than one components 16. Likewise, the vehicle 10 may be configured to include more than one energy harvesting system 12, where each energy harvesting system 12 includes at least one heat engine 14 and at least one component 16. The use of multiple heat engines 14 may take advantage of multiple regions of temperature differentials throughout the vehicle 10. Whether the energy from the energy harvesting system 12 is used to drive a component 16 directly or is stored for later usage, the energy harvesting system 12 provides additional energy to the vehicle 10 and reduces the load on the main energy sources for driving the vehicle 10. Thus, the energy harvesting system 12 increases the fuel economy and range for the vehicle 10. As described above, the energy harvesting system 12 may operate autonomously requiring no input from the vehicle 10.

Further, the shape memory alloy material 22 may change both modulus and dimension upon changing crystallographic phase to thereby convert thermal energy to mechanical energy. More specifically, the shape memory alloy material 22, if pseudoplastically pre-strained, may dimensionally contract upon changing crystallographic phase from martensite to austenite and may dimensionally expand, if under tensile stress, upon changing crystallographic phase from austenite to martensite to thereby convert thermal energy to mechanical energy. Therefore, when a temperature differential exists between the first temperature of the first region 18 and the second temperature of the second region 20, i.e., when the first region 18 and the second region 20 are not in thermal equilibrium, respective localized regions 66, 68 of the shape memory alloy material 22 disposed within the first and/or second regions 18, 20 may respectively dimensionally expand and contract upon changing crystallographic phase between martensite and austenite.

Referring to the energy harvesting system 12 of FIG. 1, the component 16 is driven by the heat engine 14. That is, mechanical energy resulting from the conversion of thermal energy by the shape memory alloy material 22 may drive the component 16. In particular, the aforementioned dimensional contraction and the dimensional expansion of the shape memory alloy material 22, coupled with the changes in modulus may drive the component 16.

Figure 3:
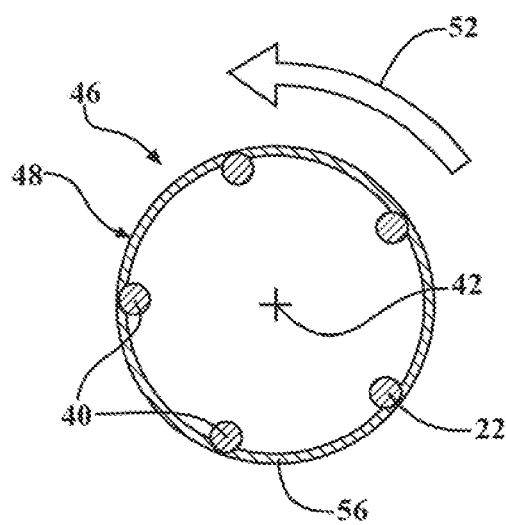
FIG. 3 is schematic cross-sectional view of FIG. 2, taken along line 3-3 of the torus.

In one variation, shown in FIGS. 2 and 3, the heat engine 14 may include a conduit 38 and at least one wire 40. The conduit 38 is disposed in the first region 18 and extends along a central axis 42. The conduit 38 may be an exhaust pipe, or any other pipe, channel, and the like that is configured to radiate heat at the first temperature. The heat engine 14 may be arranged about the conduit 38 to take advantage of the temperature differential between the heat radially emitted from the conduit 38, i.e., the first region 18, and an exterior location 44, i.e., the second region 20, radially spaced from the conduit 38. Fluid may flow through the conduit, as indicated by arrow 39, to provide a heat source.

Each of a plurality of the wires 40 form a continuous loop and circumferentially surround the conduit 38 about the central axis 42 and are each configured to be at least partially disposed in one of the first and second regions 18, 20. The wires 40 may be configured to have any suitable cross-sectional shape. For example, each of the wires 40 may be formed as at least one elongated strand of wire 40, where each elongated strand of wire 50 has a cross-section that is round, rectangular, octagonal, ribbon, strip, helical coils, or any other shape known to those skilled in the art. Additionally, the wires 40 may be formed as a braid, cable, and the like.

The plurality of wires 40 circumferentially surround conduit 38 as a continuous loop to form a torus 46. The torus 46 is generally doughnut shaped and presents a surface 48 of revolution that is generated by revolving a circle about a central axis 42. A cross-sectional view of the torus 46 of FIG. 2, taken along line 3-3, is shown in FIG. 3. A total of five wires 40 are illustrated in FIGS. 2 and 3. It should be appreciated, however, that more or less wires, as known to those skilled in the art, may also be used.

Referring to FIG. 3, the wires 40 are disposed on or near the surface 48 of the torus 46 and circumferentially surround a secondary axis 50. More specifically, the torus 46 is configured to provide a structure that would allow the surface 48 to continuously rotate in a first axial direction 52 about the secondary axis 50, relative to the conduit 38, as indicated by the arrow in FIGS. 2 and 3, in response to the application of an initial force. More specifically, the torus includes a material 56, or skin, that radially surrounds the secondary axis 50. Each wire 40 is disposed in the material 56. Accordingly, portions of the material 56 contract and expand along with the contraction and expansion of the respective localized regions 66, 68 of the wires 40. The secondary axis 50 may extend generally transverse to and surround the central axis 42. The wires 40 may be embedded in the material 56 that is flexible, resilient, and/or attached to another structure that would allow the surface 48 to rotate, i.e., a looped spring, flexible cable housing, and the like. The wires 40 may be circumferentially spaced from one another to surround the secondary axis 50. It should be appreciated that the proximity of the wires 40 to the surface 48 and/or the spacing of the wires 40 to one another may differ than that shown, as known to those skilled in the art.

The wires 40 are formed from the shape memory alloy material 22. The wires 40 that are closest to the central axis 42 have a shorted length to provide a smaller diameter than the wires 40 that are farthest from the central axis 42. This is because the wires 40 that are closest to the central axis 42 are contracted and those that are progressively farther away are stretched or expanded. When placed around the conduit 38, the wires 40 that are closest to the central axis 42 and located within the first region 18 are heated at the first temperature and, therefore contract. Conversely, the wires 40 that are radially farther away from the central axis 42 and located within the second region 20 are at the second temperature, which is less than the first temperature, such that the wires 40 may be environmentally cooled and expanded. The wires 40 are configured to rotate along with the surface 48 of the torus 46 in the first axial direction 52, about the secondary axis 50, such that the wires 40 are continuously moving into and out of the first and second regions 18, 20 as a result of being heated (contracted) and being cooled (expanded). More specifically, during rotation, the wires 40 closest to the central axis 42 continuously rotate about the secondary axis 50 to move further away from the central axis 42, while the wires 40 that are farthest from the central axis 42 continuously rotate in the first axial direction 52 to move closer to the central axis 42. Kinetic energy that results from this continuous rotation may be harvested from the surface 48 of the torus 46, as known to those skilled in the art.

The torus 46 may move or roll axially along the conduit 38, i.e., along the central axis 42, during the continuous rotation about the secondary axis 50. Alternatively, referring to FIG. 2, at least one restraining element 58 may be configured to prevent movement of the torus 46 along the conduit 38 in the direction of the central axis 42. By way of a non-limiting example, protrusions 60 may be formed on an exterior of the conduit 38 and the torus 46 may be at least partially retained between the protrusions 60. By way of another non-limiting example, the conduit 38 may define a groove or channel (not shown) that surrounds the central axis 42 and the torus 46 may be at least partially disposed and retained within the groove. The restraining element 58 may be any type of element configured to restrain the torus 46 to prevent axial movement, as known to those of skill in the art.

The torus 46 may alternatively be formed from a continuous thin film (not shown) of shape memory alloy material 22, as known to those skilled in the art. The continuous thin film of the shape memory alloy material 22 may be resilient and configured to rotate about the secondary axis 50 in response to the expansion and contraction of the localized regions 66, 68 of the shape memory alloy material 22.

As the shape memory alloy material 22 moves between thermal contact or heat exchange relation with the first region 18 and the second region 20, the shape memory alloy material 22 dimensionally expands and contracts. Additionally, the modulus of the shape memory alloy material 22 changes as the shape memory alloy material 22 moves between thermal contact or heat exchange relation with the first region 18 and the second region 20. As described above, in response to the dimensionally expanding and contracting shape memory alloy material 22 and the accompanying changes in modulus, the surface 48 of the torus 46 is driven to rotate in the first axial direction 52. It should be appreciated that the direction indicated for the first axial direction 52 may be opposite that indicated in FIGS. 2 and 3.

In operation, with reference to the energy harvesting system 12 of FIG. 1, and described with respect to the example configuration of the shape memory alloy material 22 shown in FIGS. 2 and 3, at least one wire 40 including the shape memory alloy material 22 may be immersed in, or be in heat exchange relation with, the first region 18 while at least one other wire 40 may be immersed in, or be in heat exchange relation with, the second region 20. As one wire 40, that includes the shape memory alloy material 22, dimensionally expands when under stress and in contact with the second region 20, another wire 40, that includes the shape memory alloy material 22 that is pseudoplastically pre-strained and in contact with the first region 18, dimensionally contracts. Alternating dimensional contraction and expansion of the torus 46 form of the shape memory alloy material 22, upon exposure to the temperature difference between the first region 18 and the second region 20, may cause the shape memory alloy material 22 to convert potential mechanical energy to kinetic mechanical energy, thereby rotating the surface 48 of the torus 46 and converting thermal energy to mechanical energy to drive the component 16.

Referring again to FIG. 2, the torus 46 may be connected to the component 16 such that the rotation of the torus 46 about the secondary axis 50 may drive the component 16. Speed of rotation of the torus 46 about the secondary axis 50, relative to the component 16, may optionally be modified by one or more gear sets. By way of a non-limiting example, a driven member 62 may be configured for rotation about a tertiary axis 64. The driven member 62 operatively interconnects the shape memory alloy material 22 and the component 16. The driven component 16 rotatably engages the torus 46 such that rotation of the shape memory alloy material 22 about the secondary axis 50 rotates the driven component about the tertiary axis 64 to drive the component. The tertiary axis 64 may extend generally transverse to the secondary axis 50 and the central axis 42. The driven member 62 may be a wheel, gear sets, or any other driven member 62 configured for translating rotation from the torus 46 to drive the component 16, as known to one of skill in the art.

Figure 4:
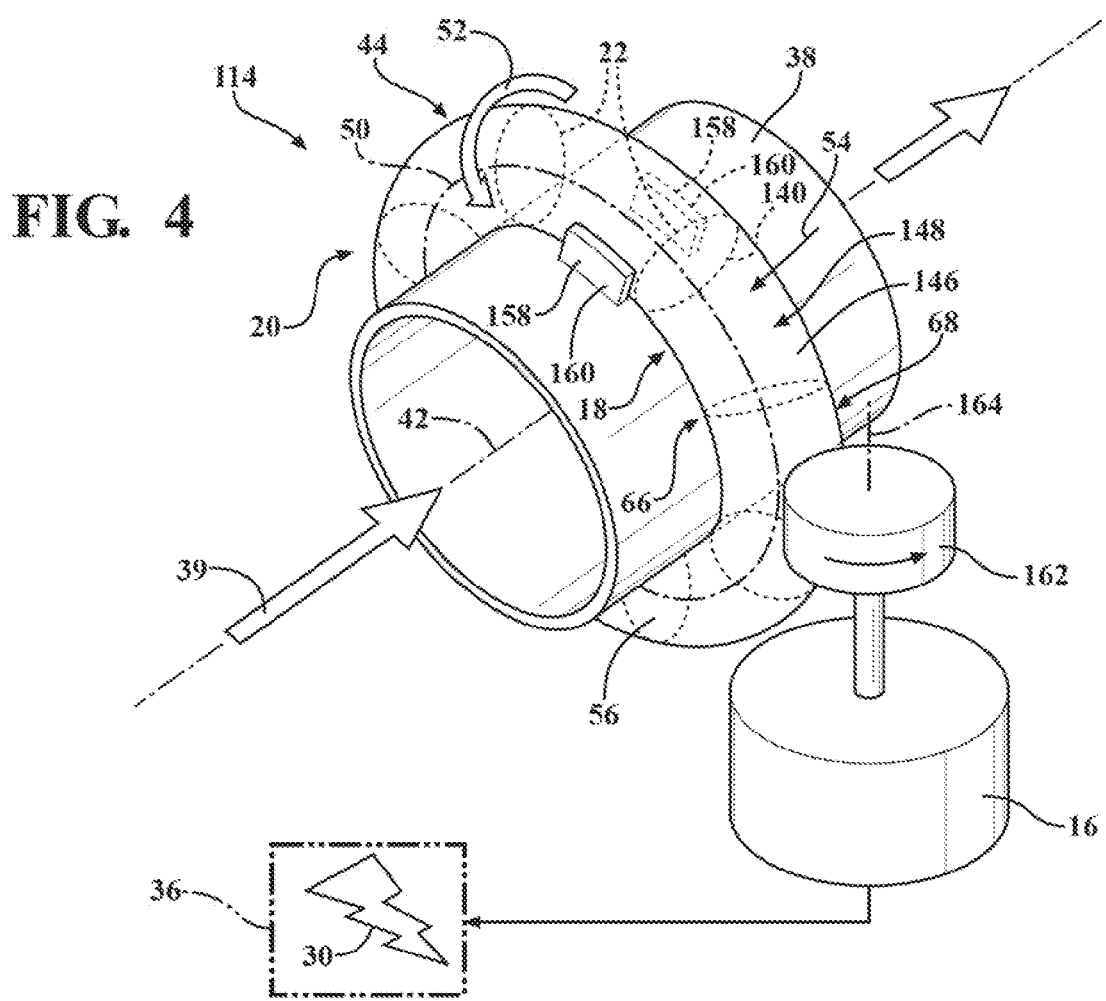
FIG. 4 is a schematic perspective view of a second embodiment of the energy harvesting system of FIG. 1 having another heat engine including another torus.

FIG. 4 illustrates a second embodiment of a heat engine 114 for use with the energy harvesting system 12 for the vehicle 10 (shown in FIG. 1). The heat engine 114 has a similar arrangement to the heat engine 14 described above in FIGS. 2 and 3. The heat engine 114 may include a torus 146 where each of a plurality of wires 140 may extend as a continuous loop about the secondary axis 50. The torus 146 presents a surface 148 of revolution that is generated by revolving a circle about the central axis 42. More specifically, each of the wires 140 is formed as a circle. The circles are disposed in circumferentially spaced relationship to one another to surround the conduit 38 about the central axis 42 to form the torus 146. The wires 140 are formed from the shape memory alloy material 22. More specifically, the torus includes the material 56 that radially surrounds the secondary axis 50. Each wire 40 is disposed in the skin material. Accordingly, portions of the material 56 contract and expand along with the contraction and expansion of the respective localized regions 66, 68 of the wires 40 The conduit 38 is within the first region 18 at the first temperature. The wires 140 are configured such that localized regions 66, 68 of each of the wires 140 are operatively disposed in each of the first and second regions 18, 20. In this embodiment, the portions of the wires 140 that are closest to the central axis 42 are heated (contracted) and the portions of the wire 140 that are further away from the central axis 42 are cooled (expanded) when the torus 146 surrounds the conduit 38. When the initial force 54 is applied to the torus 146, the torus 146 begins to rotate continuously in the first axial direction 52. The kinetic energy that results from this continuous rotation may be harvested from the surface 148 of the torus 146, as known to those skilled in the art. Fluid may flow through the conduit 38, as indicated by the arrow 39.

The torus 146 may move or roll axially along the conduit 38, i.e., along the central axis 42, during the continuous rotation about the secondary axis 50. Alternatively, referring to FIG. 4, at least one restraining element 158 may be configured to prevent movement of the torus 146 along the conduit 38 in the direction of the central axis 42. By way of a non-limiting example, protrusions 160 may be formed on an exterior of the conduit 38 and the torus 146 may be at least partially retained between the protrusions 160. By way of another non-limiting example, the conduit 38 may define a groove or channel (not shown) that surrounds the central axis 42 and the torus 146 may be at least partially disposed and retained within the groove. The restraining element 158 may be any type of element configured to restrain the torus 146 to prevent axial movement, as known to those of skill in the art.

As the shape memory alloy material 22 moves between thermal contact or heat exchange relation with the first region 18 and the second region 20, the shape memory alloy material 22 dimensionally expands and contracts. Additionally, the modulus of the shape memory alloy material 22 changes as the localized regions 66, 68 of the shape memory alloy material 22 move between thermal contact or heat exchange relation with the first region 18 and the second region 20. In response to dimensionally expanding and contracting the localized regions 66, 68 of the shape memory alloy material 22 and the accompanying changes in modulus, the surface 148 of the torus 146 rotates about the secondary axis 50, relative to the conduit 38 and the central axis 42.

The torus 146 may be operatively connected to the component 16 such that the rotation of the surface 148 of the torus 146 about the secondary axis 50 may drive the component 16, i.e., via a driven member 162 and the like. Speed of rotation of the surface 148 of the torus 146, relative to the component 16, may optionally be modified by one or more gear sets.

Referring again to FIG. 4, the torus 146 may be connected to the component 16 such that the rotation of the torus 146 about the secondary axis 50 drives the component 16. Speed of rotation of the torus 146 about the secondary axis 50, relative to the component 16, may optionally be modified by one or more gear sets. By way of a non-limiting example, a driven member 162 may be configured for rotation about a tertiary axis 164. The driven member 162 operatively interconnects the shape memory alloy material 22 and the component 16. The driven component rotatably engages the torus 146 such that rotation of the shape memory alloy material 22 about the secondary axis 50 rotates the driven component about the tertiary axis 164 to drive the component 16. The tertiary axis 164 may extend generally transverse to the secondary axis 50 and the central axis 42. The driven member 162 may be a wheel, gear sets, or any other driven member 162 configured for translating rotation from the torus 146 to drive the component 16, as known to one of skill in the art.

Figure 5:
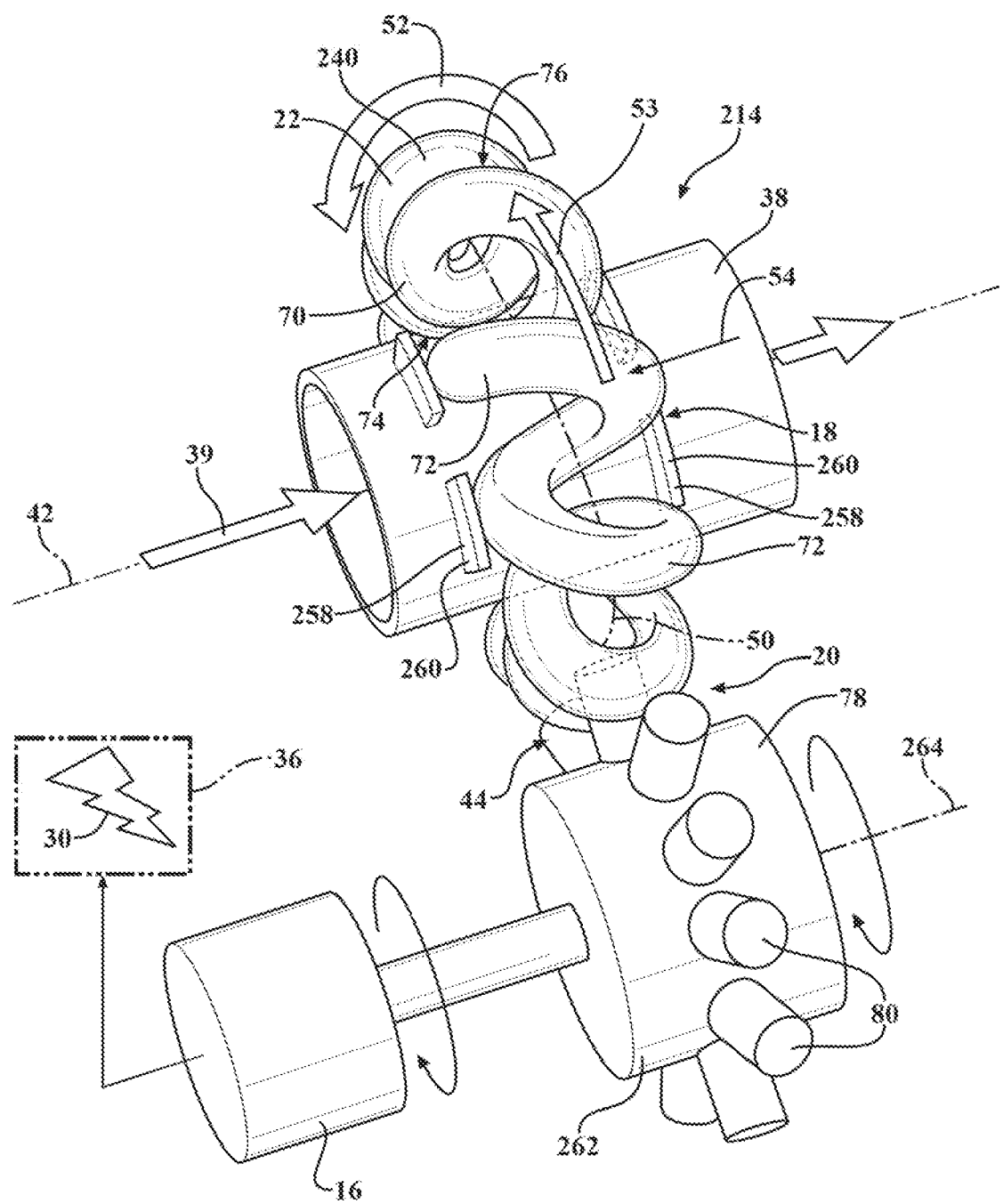
FIG. 5 a schematic perspective view of a third embodiment of the energy harvesting system of FIG. 1 having a heat engine including a continuously looped helical spring.

FIG. 5 illustrates a third embodiment of a heat engine 214 for use with the energy harvesting system 12 for the vehicle, shown in FIG. 1. In this embodiment, the heat engine 214 includes a continuously looped helical spring 70 that includes a plurality of coils 72 extending along the secondary axis 50. The continuously looped helical spring 70 circumferentially extends about the conduit 38 and surrounds the central axis 42. Therefore, the coils 72 surround the central axis 42 in generally circumferentially spaced relationship to one another. The continuously looped helical spring 70 is formed from wire 240. The wire 240 is formed from the shape memory alloy material 22. An inner portion 74 of the looped helical spring 70 that is closest to the central axis 42, i.e., the localized region 66, experiences less strain than an outer portion 76 of the looped helical spring 70 furthest away from the central axis 42, i.e., another localized region 68, providing a required strain gradient. As a result, when the continuously looped helical spring 70 surrounds the conduit 38, the inner portion 74 attempts to contract, due to heating of the inner portion 74. When an initial force 54 is applied to the continuously looped helical spring 70, the coils 72 of the looped helical spring 70 begin to rotate about the secondary axis 50 in the first axial direction 52, relative to the central axis 42, such that the localized region 66 of the inner portion 74 is heated and contracted toward the central axis 42, while the other localized region 68 of the outer portion 76 is cooled and stretched away from the central axis 42. As the localized region 66 contracts, the other localized region 68 of the coil 72 that is expanded is pulled toward the central axis 42 while the localized region 66 of the coil 72 is expelled away from the central axis 42.

To prevent this heat engine 214 from moving or rolling axially along the conduit 38, the heat engine 214 may include a restraining element 258 that is configured to axially restrain the continuously looped helical spring 70, as known to those skilled in the art. If the looped helical spring 70 is held axially stationary, relative to the central axis 42, the coils 72 would snake or otherwise rotate about the central axis 42 in a second axial direction 53, transverse to the direction of rotation of the first axial direction 52, while providing another form of kinetic energy to be harvested. By way of a non-limiting example, protrusions 260 may be formed on an exterior of the conduit 38 and the continuously looped helical spring 70 may be at least partially retained between the protrusions 260. By way of another non-limiting example, the conduit 38 may define a groove or channel (not shown) that surrounds the central axis 42 and the continuously looped helical spring 70 may be at least partially disposed and retained within the groove. The restraining element 258 may be any type of element configured to restrain the continuously looped helical spring 70 to prevent axial movement along the central axis 42, as known to those of skill in the art.

As the shape memory alloy material 22 moves between thermal contact or heat exchange relation with the first region 18 and the second region 20, the shape memory alloy material 22 dimensionally expands and contracts. Additionally, the modulus of the shape memory alloy material 22 changes as the shape memory alloy material 22 moves between thermal contact or heat exchange relation with the first region 18 and the second region 20. In response to the dimensionally expanding and contracting shape memory alloy material 22 and the accompanying changes in modulus, the coils 72 of the looped helical spring rotate axially, relative to the central axis 42.

The temperature differential between the first region 18 and the second region 20 causes the shape memory alloy to sufficiently dimensionally contract or expand in order to rotate the coils 72 of the looped helical spring, after the application of the initial force 54 to the coils 72 of the looped helical spring.

The looped helical spring may be operatively connected to the component 16 such that the rotation of the coils 72 of the looped helical spring may drive the component 16. Speed of rotation of the coils 72 of the continuously looped helical spring 70 relative to the component 16 may optionally be modified by one or more gear sets (not shown).

Referring again to FIG. 5, the continuously looped helical spring 70 may be operatively connected to the component 16 such that the rotation of the continuously looped helical spring 70 about the secondary axis 50 may drive the component 16. Speed of rotation of the continuously looped helical spring 70 about the secondary axis 50, in the first axial direction 52, and about the central axis 42, in a second axial direction 53, relative to the component 16, may optionally be modified by one or more gear sets. By way of a non-limiting example, a driven member 262 may be configured for rotation about a tertiary axis 264. The driven member 262 operatively interconnects the shape memory alloy material 22 and the component 16. The driven component 16 rotatably engages the continuously looped helical spring 70 such that rotation of the shape memory alloy material 22 about the secondary axis 50 rotates the driven component 16 about the tertiary axis 264 to drive the component 16. The tertiary axis 264 may extend generally parallel to the central axis 42. The driven member 262 may be a pinion 78 having a plurality of radially extending teeth 80 that circumferentially surround the tertiary axis 264. The teeth 80 are configured to mesh with corresponding coils 72 of the continuously looped helical spring 70, as the continuously looped helical spring 70 rotates about the secondary axis 50, in the first axial direction 52, and about the central axis 42, in the second axial direction 53, to rotate the pinion 78 about the tertiary axis 264. The pinion 78 is operatively connected to the component 16 such that rotation of the pinion 78 about the tertiary axis 264 drives the component 16. It should be appreciated that any other driven member 262 configured for translating rotation from the continuously looped helical spring 70 to drive the component 16, as known to one of skill in the art, may also be used.

While the best modes for carrying out the invention have been described in detail, those familiar with the art to which this invention relates will recognize various alternative designs and embodiments for practicing the invention within the scope of the appended claims.

The invention claimed is:

1. A heat engine configured to be operatively connected to a component, the heat engine comprising:
   a first region at one of a first temperature and a second temperature;
   a second region at the other of the first temperature and a second temperature;
   a conduit disposed in the first region and extending along a central axis;
   at least one piece of shape memory alloy material forming a continuous loop and circumferentially surrounding the conduit about the central axis and configured to be at least partially disposed in one of the first region and the second region;
   wherein the at least one piece of shape memory alloy material is radially spaced from a secondary axis that circumferentially surrounds the central axis;
   wherein at least one localized region of the at least one piece of shape memory alloy material is configured to selectively change crystallographic phase from martensite to austenite and thereby circumferentially contract in response to exposure to the first temperature;
   wherein the at least one localized region of the at least one piece of shape memory alloy material is also configured to selectively change crystallographic phase from austenite to martensite and thereby circumferentially expand in response to exposure to the second temperature;
   wherein the at least one piece of shape memory alloy material is configured to rotate about the secondary axis in response to the contraction and expansion of the at least one localized region of the at least one piece of shape memory alloy material such that the at least one localized region of the at least one piece of shape memory alloy material moves into and out of the first and second regions.

2. A heat engine, as set forth in claim 1, wherein the at least one piece of shape memory alloy material is a plurality of pieces of shape memory alloy material surrounding the central axis;
   wherein the plurality of pieces of shape memory alloy material are disposed in radially spaced and parallel relationship to one another to form a torus surrounding the secondary axis;
   wherein the plurality of pieces of shape memory alloy material are configured to rotate about the secondary axis in response to the contraction and expansion of the at least one localized region of each of the plurality of pieces of shape memory alloy material.

3. A heat engine, as set forth in claim 2, further comprising a skin radially surrounding the secondary axis;
   wherein each of the plurality of pieces of shape memory alloy material are disposed in the skin such that skin corresponding to the at least one localized region of each of the plurality of pieces of shape memory alloy material also contract and expand in response to the contraction and expansion of the respective at least one localized region of each of the plurality of pieces of shape memory alloy material.

4. A heat engine, as set forth in claim 3, wherein the skin is resilient.

5. A heat engine, as set forth in claim 3, wherein the plurality of pieces of shape memory alloy material are equally circumferentially spaced about the secondary axis.

6. A heat engine, as set forth in claim 1, wherein the at least one piece of shape memory alloy material is a continuous loop of shape memory alloy material circumferentially surrounding the conduit about the central axis.

7. A heat engine, as set forth in claim 6, wherein the continuous loop of shape memory alloy material is a continuous helical loop revolved about the secondary axis.

8. A heat engine, as set forth in claim 1, wherein the at least one piece of shape memory alloy material is configured to rotate about the central axis in response to the contraction and expansion of the at least one localized region of at least one piece of shape memory alloy material.

9. A heat engine, as set forth in claim 1, wherein the heat engine further comprises a restraining element configured to prevent axial movement of the at least one piece of shape memory alloy material along the central axis as the at least one piece of shape memory alloy material rotates about the secondary axis in response to the contraction and expansion of the at least one localized region of at least one piece of shape memory alloy material.

10. An energy harvesting system comprising:
    a heat engine including:
       a first region at one of a first temperature and a second temperature;
       a second region at the other of the first temperature and a second temperature;
       a conduit disposed in the first region and extending along a central axis;
       at least one piece of shape memory alloy material circumferentially surrounding the conduit about the central axis and configured to be at least partially disposed in one of the first region and the second region;

wherein the at least one piece of shape memory alloy material is radially spaced from a secondary axis that circumferentially surrounds the central axis;

wherein at least one localized region of the at least one piece of shape memory alloy material is configured to selectively change crystallographic phase from martensite to austenite and thereby circumferentially contract in response to exposure to the first temperature;

wherein the at least one localized region of the at least one piece of shape memory alloy material is also configured to selectively change crystallographic phase from austenite to martensite and thereby circumferentially expand in response to exposure to the second temperature;

wherein the at least one piece of shape memory alloy material is configured to rotate about the secondary axis in response to the contraction and expansion of the at least one localized region of the at least one piece of shape memory alloy material such that the at least one localized region of the at least one piece of shape memory alloy material moves into and out of the first and second regions; and a component operatively connected to the at least one shape memory alloy material such that rotation of the shape memory alloy material about the secondary axis drives the component.

11. An energy harvesting device, as set forth in claim 10, wherein the conduit is at the first temperature.

12. An energy harvesting device, as set forth in claim 10, further comprising a driven member configured for rotation about a tertiary axis;

wherein the driven member operatively interconnects the shape memory alloy material and the component; and wherein the driven component rotatably engages the at least one piece of shape memory alloy material such that rotation of the shape memory alloy material about the secondary axis rotates the driven component about the tertiary axis to drive the component.

13. An energy harvesting device, as set forth in claim 12, wherein the driven member is a wheel and the tertiary axis is generally transverse to each of the secondary axis and the central axis.

14. An energy harvesting device, as set forth in claim 13, wherein the driven member is a pinion including a plurality of radially extending teeth configured for engagement with the at least one shape memory alloy material; and wherein the tertiary axis is transverse to the secondary axis and disposed in spaced and generally parallel relationship to the central axis.

15. An energy harvesting device, as set forth in claim 10, further comprising at least one restraining feature configured to prevent the at least one piece of shape memory alloy material from moving axially along the central axis as the at least one piece of shape memory alloy material rotates about the secondary axis.

16. An energy harvesting device, as set forth in claim 10, wherein the at least one piece of shape memory alloy material is configured to rotate about the central axis in response to the contraction and expansion of the at least one localized region of at least one piece of shape memory alloy material.

17. An energy harvesting system comprising:
a heat engine including:
a first region at one of a first temperature and a second temperature;
a second region at the other of the first temperature and a second temperature;
a conduit disposed in the first region and extending along a central axis;
at least one wire forming a continuous loop and circumferentially surrounding the conduit about the central axis;
wherein the at least one wire is configured to be at least partially disposed in one of the first region and the second region;
wherein the at least one wire includes a shape memory alloy material;
wherein the at least one wire is radially spaced from a secondary axis that circumferentially surrounds the central axis;
wherein at least one localized region of the at least one wire is configured to selectively change crystallographic phase from martensite to austenite and thereby circumferentially contract in response to exposure to the first temperature;
wherein the at least one localized region of the at least one wire is also configured to selectively change crystallographic phase from austenite to martensite and thereby circumferentially expand in response to exposure to the second temperature;
wherein the at least one wire is configured to rotate about the secondary axis in response to the contraction and expansion of the at least one localized region of the at least one wire such that the at least one localized region of the at least one wire moves into and out of the first and second regions; and
a component operatively connected to the at least one wire such that rotation of the wire about the secondary axis drives the component.

* * * * *